No. 789,889. PATENTED MAY 16, 1905.
E. SUTHERLAND.
BUTTER CUTTER.
APPLICATION FILED FEB. 17, 1905.
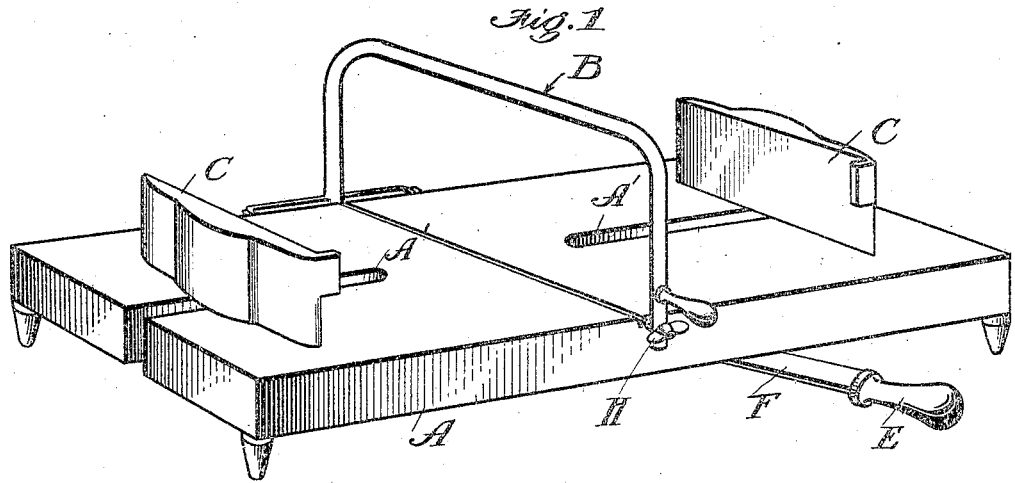
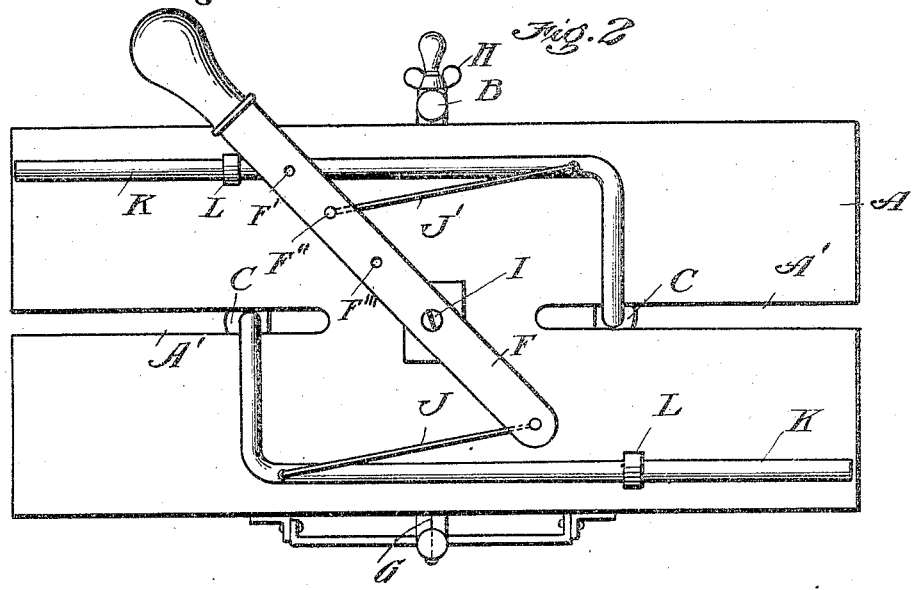
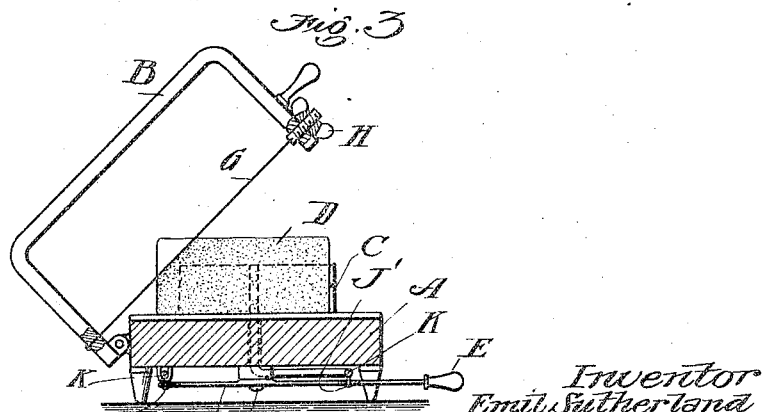
Witnesses
Edmund G. Strauss
Myrtle Jones
Inventor
Emil Sutherland
by Hazard & Harpham
Attorneys.

No. 789,889.

Patented May 16, 1905.

UNITED STATES PATENT OFFICE.

EMIL SUTHERLAND, OF LOS ANGELES, CALIFORNIA.

BUTTER-CUTTER.

SPECIFICATION forming part of Letters Patent No. 789,889, dated May 16, 1905.

Application filed February 17, 1905. Serial No. 246,162.

*To all whom it may concern:*

Be it known that I, EMIL SUTHERLAND, a citizen of the United States, residing at Los Angeles, in the county of Los Angeles and State of California, have invented new and useful Improvements in Butter-Cutters, of which the following is a specification.

The object of my invention is to provide simple, handy, and reliable means to cut butter into pounds, half-pounds and quarter-pounds, or to divide a quantity of butter into different divisions thereof which will always be handy and accessible to a grocer or other party engaged in handling butter. I accomplish these objects by means of the device described herein and shown in the accompanying drawings, in which—

Figure 1 is a perspective view of a butter-cutter embodying my invention. Fig. 2 is a bottom plan. Fig. 3 is a transverse vertical section thereof, partly in elevation, with a cake of butter therein, the butter-bar being thrown into its cutting position, the cake being shown partly cut.

In the drawings, A is the body portion or frame, upon which the cutter-bar B is pivoted, so as to swing transversely across the center of the frame, and is thereby adapted to be swung backwardly and out of place for the insertion on the frame and between the followers C of a cake D of butter. When the cake of butter to be cut is placed upon the frame, the handle E on the operating-lever F is grasped and moved in a direction to draw the followers secured thereon together. These followers when mounted as shown in Figs. 1 and 2 will always be equidistant from the cutter-bar B and hold the substance to be operated on centrally under the cutting-wire G, tightly mounted in the cutter-bar by means of the thumb-nut H. The operating-lever is pivoted centrally, as at I, on the bottom of the frame and has a plurality of openings F′, F″, and F‴ therethrough to vary the stroke of one of the followers in order that the substance operated on may be cut in the center or at any other divisional line thereof. If the connecting-rod J′ is placed in F″, it will divide the substance into halves, or it may be divided into different quantities as desired by moving the connecting-rod J into different openings F′ or F‴. These connecting-rods are pivotally attached at their other ends to the guides K, running in bearings L. This end of the guide-rod is upturned and passes through the longitudinal slot A′ in the frame and carries in its upper end one of the followers C.

Having described my invention, what I claim as new, and desire to secure by Letters Patent, is—

1. A butter-cutter comprising a frame or body portion; a lever pivotally attached thereto having followers mounted on either end of the frame and adapted to move longitudinally along the frame on the movement of the operating-lever and a butter-cutter mounted on the side of the frame and adapted to swing across the frame and divide the butter in place on the frame.

2. A butter-cutter comprising a main body portion A having a pivoted operating-lever F secured thereon; a cutter-bar B transversely mounted on the frame and carrying a cutting-wire G secured thereon; followers C workably secured to the operating-lever and having a longitudinal movement along the face of the frame upon the movement of the operating-lever.

3. The herein-described butter-cutter comprising a frame A; a cutter-bar B pivotally secured thereon and having a cutting-wire G adjustably mounted on the cutter-bar; an operating-lever F centrally pivoted on the bottom of the frame and carrying the connecting-rods J; guide-rods K mounted on the body portion and having a longitudinal movement thereon; the connecting-rods J pivoted at one end in the guide-rod and the other end in the operating-lever; followers C rigidly secured to the guide-rods and having a longitudinal movement along the face of the frame.

4. In a butter-cutter of the character herein described an operating-lever pivotally mounted in the center of the frame and having a plurality of openings therein for the reception of connecting-rods the openings spaced apart one from the other substantially as shown and described.

5. Means to cut butter into different divisions comprising a frame for the placement thereon of the butter to be cut; a pivoted cutter mounted on the side of the frame and centrally of its length and adapted to be swung across the face of the frame; followers mounted on either end of the body portion and workably connected with an operating-lever; an operating-lever pivotally mounted in the center of the frame.

In witness that I claim the foregoing I have hereunto subscribed my name this 7th day of February, 1905.

EMIL SUTHERLAND.

Witnesses:
HENRY T. HAZARD,
EDMUND A. STRAUSE.